(12) United States Patent
Yu et al.

(10) Patent No.: US 10,498,813 B2
(45) Date of Patent: Dec. 3, 2019

(54) SYSTEM AND METHOD FOR CROSS-NETWORK DATA STORAGE

(71) Applicant: Hangzhou Hikvision Digital Technology Co., Ltd., Hangzhou (CN)

(72) Inventors: Jialiu Yu, Hangzhou (CN); Xiaoyuan Zhang, Hangzhou (CN); Xiangqing Jin, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 793 days.

(21) Appl. No.: 14/415,168

(22) PCT Filed: Mar. 27, 2013

(86) PCT No.: PCT/CN2013/073263
§ 371 (c)(1),
(2) Date: Jan. 16, 2015

(87) PCT Pub. No.: WO2013/155926
PCT Pub. Date: Oct. 24, 2013

(65) Prior Publication Data
US 2015/0215403 A1 Jul. 30, 2015

(30) Foreign Application Priority Data

Apr. 18, 2012 (CN) .......................... 2012 1 0114468

(51) Int. Cl.
*H04L 29/08* (2006.01)
*H04L 12/64* (2006.01)
(Continued)

(52) U.S. Cl.
CPC ...... *H04L 67/1097* (2013.01); *H04L 12/6418* (2013.01); *H04L 61/2007* (2013.01); *H04N 5/765* (2013.01); *H04N 21/274* (2013.01)

(58) Field of Classification Search
CPC ............. H04L 67/1097; H04L 12/6418; H04L 61/2007; H04N 5/765; H04N 21/274
(Continued)

(56) References Cited

U.S. PATENT DOCUMENTS 6,118,472 A * 9/2000 Dureau ............... H04L 12/2801
348/E7.063
6,853,650 B1 * 2/2005 Hutzelmann ........... H04L 12/66
370/468
(Continued)

FOREIGN PATENT DOCUMENTS

CN 101325553 A 12/2008
CN 101334707 A 12/2008
(Continued)

OTHER PUBLICATIONS

International Search Report in Application No. PCT/CN2013/073263 dated Jul. 4, 2013.
(Continued)

*Primary Examiner* — Krisna Lim
(74) *Attorney, Agent, or Firm* — Marshall, Gerstein & Borun LLP

(57) ABSTRACT

Provided is a system for cross-network data storage. A gateway is used for connecting a first network and a second network; a client sends an address acquisition instruction and a first IP address and port number of a coder to the gateway, acquires a second IP address and port number of the coder from the gateway, and sends a stream acquisition instruction and a first IP address and port number of a PCNVR to the gateway; the coder receives the address acquisition instruction and sends the second IP address and port of the coder to the gateway; and the PCNVR parses the stream acquisition instruction to acquire the second IP address and port number of the coder, acquires a code stream from the coder via the second network, and stores same.

(Continued)

Also provided is a method for cross-network data storage. The method and system of the present invention can be adopted to reduce network bandwidth pressure of an external network, and improve the stability of data storage.

8 Claims, 4 Drawing Sheets

(51) Int. Cl.
*H04L 29/12* (2006.01)
*H04N 21/274* (2011.01)
*H04N 5/765* (2006.01)

(58) Field of Classification Search
USPC .................................................. 709/219
See application file for complete search history.

(56) References Cited

U.S. PATENT DOCUMENTS

| | | | | |
|---|---|---|---|---|
| 6,862,267 | B1* | 3/2005 | Hughes | H04L 29/06 370/252 |
| 7,957,382 | B1* | 6/2011 | Somasundaram | H04L 61/25 370/392 |
| 8,922,658 | B2* | 12/2014 | Galvin | H04N 7/181 348/143 |
| 9,258,271 | B1* | 2/2016 | Anderson | H04L 61/255 |
| 9,414,124 | B2* | 8/2016 | Bihannic | H04N 21/2381 |
| 9,419,921 | B1* | 8/2016 | Anderson | H04L 49/70 |
| 2003/0214955 | A1* | 11/2003 | Kim | H04L 12/4633 370/400 |
| 2004/0054792 | A1* | 3/2004 | Pitsos | H04L 63/02 709/229 |
| 2004/0136388 | A1* | 7/2004 | Schaff | G08B 13/19656 370/401 |
| 2005/0120279 | A1* | 6/2005 | Furukawa | H04L 63/0236 714/43 |
| 2005/0175036 | A1* | 8/2005 | Umezaki | H04L 29/06027 370/490 |
| 2006/0071779 | A1* | 4/2006 | Renkis | G08B 13/19619 340/539.1 |
| 2006/0209832 | A1* | 9/2006 | Keller-Tuberg | H04L 12/4641 370/392 |
| 2008/0075096 | A1* | 3/2008 | Wagner | H04L 29/12509 370/401 |
| 2008/0101389 | A1* | 5/2008 | Hiribarren | H04L 29/06027 370/401 |
| 2008/0247541 | A1* | 10/2008 | Cholas | H04L 63/0464 380/200 |
| 2009/0164553 | A1* | 6/2009 | Chiu | H04L 12/581 709/202 |
| 2010/0002693 | A1* | 1/2010 | Rao | H04L 12/2856 370/389 |
| 2011/0213928 | A1* | 9/2011 | Grube | G06F 11/1076 711/E12.103 |
| 2012/0023257 | A1* | 1/2012 | Vos | H04L 29/12377 709/232 |
| 2012/0158894 | A1* | 6/2012 | Desgagne | H04N 21/6125 709/217 |
| 2012/0195363 | A1* | 8/2012 | Laganiere | H04L 12/6418 375/240.01 |
| 2013/0073699 | A1* | 3/2013 | Lan | H04L 61/2015 709/220 |
| 2013/0287006 | A1* | 10/2013 | Nix | H04L 29/125 370/331 |
| 2015/0201015 | A1* | 7/2015 | Chu | H04L 67/1097 709/217 |
| 2016/0205020 | A1* | 7/2016 | Xu | H04L 45/04 370/392 |
| 2016/0294913 | A1* | 10/2016 | Jansson | H04L 67/02 |
| 2016/0294948 | A1* | 10/2016 | Chen | H04L 67/1097 |

FOREIGN PATENT DOCUMENTS

| | | |
|---|---|---|
| CN | 102394927 A | 3/2012 |
| CN | 102664948 A | 9/2012 |
| WO | WO-2006012612 A1 | 2/2006 |
| WO | WO-2011140954 A1 | 11/2011 |

OTHER PUBLICATIONS

"Analysis and selection of a high-definition video surveillance for Expressway" p. 103-106 (2011).
Office Action from Chinese Application No. 201210114468.4 dated Dec. 2, 2014.
Office Action from Chinese Application No. 201210114468.4 dated Mar. 31, 2014.
Search report from European Application No. 13777932.8 dated Mar. 18, 2016.

* cited by examiner

SYSTEM AND METHOD FOR
CROSS-NETWORK DATA STORAGE

CROSS-REFERENCE TO RELATED
APPLICATIONS

This application is a U.S. national phase application under 35 U.S.C. § 371 of International Application No. PCT/CN2013/073263, filed Mar. 27, 2013, entitled "System and Method for Cross-Network Data Storage", which claims the priority of Chinese Patent Application No. 201210114468.4 filed Apr. 18, 2012, the entire respective disclosures of which are incorporated herein by reference.

FIELD OF THE INVENTION

The present invention relates to a network communication technology field, and more particularly, to a method and system for storing data across networks.

BACKGROUND OF THE INVENTION

FIG. 1 is a schematic diagram illustrating a method and system for storing data across networks. According to FIG. 1, a current system for storing data across networks is illustrated as follows.

The current system for storing data across networks includes: a client 101, a Net Video Record Software for Personal computer (PCNVR) 102, a gateway 103 and at least one encoder 104. The client 101 and a PCNVR 102 access an external network, e.g., a wide area network. The at least one encoder 104 accesses an internal network, e.g., local area network. The PCNVR 102 and the encoder 104 store data across networks through the gateway 103.

The client 101 receives an Internet Protocol (IP) address and a port number of the encoder 104 in the external network inputted externally, configures an IP address and a port number of the encoder 104 for the PCNVR 102 in the external network, and transmits the IP address and the port number of the encoder 104 in the external network to the PCNVR 102. The client 101 performs flow obtaining, decoding and storage from an internal network through the PCNVR 102. According to the IP address and the port number in the external network, through the gateway 103 that is connected with the encoder 104, the PCNVR 102 receives a code flow from the encoder 104, and stores the code flow as a file. The gateway 103 maps the IP address in the external network into an IP address in the internal network, and pushes the code flow outputted by the encoder 104 corresponding to the IP address in the internal network to the PCNVR 102 through a port corresponding to the port number. The encoder 104 performs analog-digital conversion for a received analog signal, compresses a converted digital signal based on a video compression algorithm, and transmits a code flow obtained after compression to the gateway 103.

In the current system for storing data across networks, the client and the PCNVR have to be configured in a same external network segment. When the code flow from the encoder is transmitted to the PCNVR in an external network from the internal network through the gateway, a lot of bandwidth of the external network will be occupied. Thus, bandwidth pressure of the external network is enhanced. Furthermore, there is much network interference, which will cause data loss of the code flow that is from the internal network, is received by the PCNVR, and is to be stored. Thus, stability of data storage is poor, which will be further improved. Thus, network bandwidth pressure of an external network is reduced and stability of data storage is improved.

SUMMARY OF THE INVENTION

A system for storing data across networks is provided according to embodiments of the present invention so as to reduce network bandwidth pressure of an external network and to improve stability of data storage.

A method for storing data across networks is provided according to embodiments of the present invention so as to reduce network bandwidth pressure of an external network and to improve stability of data storage.

A system for storing data across networks includes:

a gateway, to connect a first network and a second network;

a client in the first network, to transmit an address obtaining instruction, a first IP address and a first port number of an encoder in the first network to the gateway, obtain a second IP address and a second port number of the encoder in the second network from the gateway, transmits a flow obtaining instruction, a first IP address and a first port number of a Net Video Record Software for Personal computer (PCNVR) in the first network to the gateway, wherein the flow obtaining instruction at least carries the second IP address and the second port number of the encoder;

the encoder in the second network, to receive the address obtaining instruction forwarded from the gateway according to the first IP address and the first port number of the encoder, transmit the second IP address and the second port number of the encoder to the gateway;

the gateway, to map the first IP address and the first port number of the PCNVR in the first network to a second IP address and a second port number of the PCNVR in the second network, transmit the flow obtaining instruction according to the second IP address and the second port number of the PCNVR; and the PCNVR in the second network, to parse the flow obtaining instruction, obtain the second IP address and the second port number of the encoder, obtain a code flow from the encoder through the second network, and store the code flow.

In the system, the client includes:

a flow-obtaining-controlling module, to connect with the gateway through the first network, generate the address obtaining instruction according to the received first IP address and the first port number of the encoder, transmit the address obtaining instruction, the first IP address and the first port number of the encoder to the gateway, write the second IP address and the second port number of the encoder forwarded from the encoder to a first storage module, generate the flow obtaining instruction, transmit the flow obtaining instruction, the first IP address and the first port number of the PCNVR to the gateway;

the first storage module, to store the second IP address and the second port number of the encoder.

In the system, the PCNVR includes:

an instruction parsing module, to connect with the gateway through the second network, parse the flow obtaining instruction from the gateway, obtain the second IP address and the second port number of the encoder, transmit a code flow obtaining instruction to the encoder, write the code flow pushed by the encoder to a second storage module, wherein the code flow obtaining instruction at least carries the second IP address and the second port number of the PCNVR;

the second storage module, to store the code flow as a file.

In the system, the encoder includes:

a code flow controlling module, to connect with the gateway and the PCNVR through the second network, transmit the second IP address and the second port number of the encoder to the gateway according to the address obtaining instruction, parse a code flow obtaining instruction from the PCNVR to obtain the second IP address and the second port number of the PCNVR, and transmit the second IP address and the second port number of the PCNVR to an encoding module;

the encoding module, to push a code flow obtained after compression to the second IP address and the second port number of the PCNVR.

A method for storing data across networks includes:

A, transmitting, by a client, an address obtaining instruction, a first IP address and a first port number of an encoder in a first network to a gateway, obtaining a second IP address and a second port number of the encoder in a second network from the gateway;

B, transmitting, by the client, a flow obtaining instruction, a first IP address and a first port number of a Net Video Record Software for Personal computer (PCNVR) in the first network to the gateway through a first network, wherein the flow obtaining instruction at least carries the second IP address and the second port number of the encoder;

C, mapping, by the gateway, the first IP address and the first port number of the PCNVR to a second IP address and a second port number of the PCNVR in the second network, transmitting the flow obtaining instruction to the PCNVR through the second network; and D, parsing, by the PCNVR, the flow obtaining instruction, obtaining the second IP address and the second port number of the encoder, obtaining a code flow from the encoder through the second network, storing the code flow.

In the method, the step A includes:

A1, generating, by the client, the address obtaining instruction according to the received first IP address and the first port number of the encoder, transmitting the address obtaining instruction, the first IP address and the first port number of the encoder to the gateway through the first;

A2, mapping, by the gateway, the first IP address and the first port number of the encoder to the second IP address and the second port number of the encoder, transmitting the address obtaining instruction to the encoder through the second network;

A3, transmitting, by the encoder, the second IP address and the second port number of the encoder to the gateway through the second network according to the received address obtaining instruction;

A4, forwarding, by the gateway, the received second IP address and the second port number of the encoder to the client.

In the method, the step B comprises:

B1, generating, by the client, a flow obtaining instruction according to the second IP address and the second port number of the encoder;

B2, transmitting, by the client, the flow obtaining instruction and the received first IP address and the first port number of the PCNVR to the gateway through the first network.

In the method, the step D comprises:

D1, parsing, by the PCNVR, the flow obtaining instruction, obtaining the second IP address and the second port number of the encoder, generating a code flow obtaining instruction according to the second IP address and the second port number of the PCNVR, transmitting the code flow obtaining instruction to the second IP address and the second port number to the encoder through the second network;

D2, parsing, by the encoder, the code flow obtaining instruction, obtaining the second IP address and the second port number of the PCNVR, pushing the code flow to the second IP address and the second port number of the PCNVR through the second network.

It can be seen from the technical solution above that, in the system and method for storing data across networks, a gateway is to connect a first network and a second network; a client in the first network is to transmit an address obtaining instruction, a first IP address and a first port number of an encoder to the gateway, obtain a second IP address and a second port number of the encoder from the gateway, transmits a flow obtaining instruction, a first IP address and a first port number of a Net Video Record Software for Personal computer (PCNVR) to the gateway; the encoder is to receive the address obtaining instruction forwarded, transmit the second IP address and the second port number of the encoder to the gateway; and the PCNVR is to parse the flow obtaining instruction, obtain the second IP address and the second port number of the encoder, obtain a code flow from the encoder through the second network, and store the code flow. According to the method of the present invention, network bandwidth pressure of an external network is reduced and stability of data storage is improved.

DETAILED DESCRIPTION OF THE INVENTION

In order to make the object, technical solution and merits of the present invention clearer, the present invention will be illustrated in detail hereinafter with reference to the accompanying drawings and specific examples.

A method for storing data across networks is provided according to an embodiment of the present invention. In the method, a PCNVR is not located in a network at a same side with the client. That is, the PCNVR may not access a first network, and may locate in a network at a same side with an encoder, i.e., a second network. In an example, the first network is an external network, and the second network is an internal network. In another example, the first network is the internal network, and the second network is the external network.

The client is located in the external network. The PCNVR and the encoder are located in the same side network, i.e., the PCNVR and the encoder access the internal network. A code flow is obtained from the encoder by the PCNVR through an internal network. Thus, a bandwidth of the external network is not occupied. A process that the PCNVR obtains the code flow and stores the code flow obtained from the encoder cannot be interfered by network interference in the external network, stability of data storage is improved. In the embodiment of the present invention, the external network and the internal network are connected via the gateway.

In an example, the first network is the external network, and the second network is the internal network. In another example, the first network is the internal network, and the second network is the external network. It should be pointed out that, a first IP address and a first port number of a device is used to identify the device in the first network, and a second IP address and a second port number of a device is used to identify the device in the second network.

Figure 1:
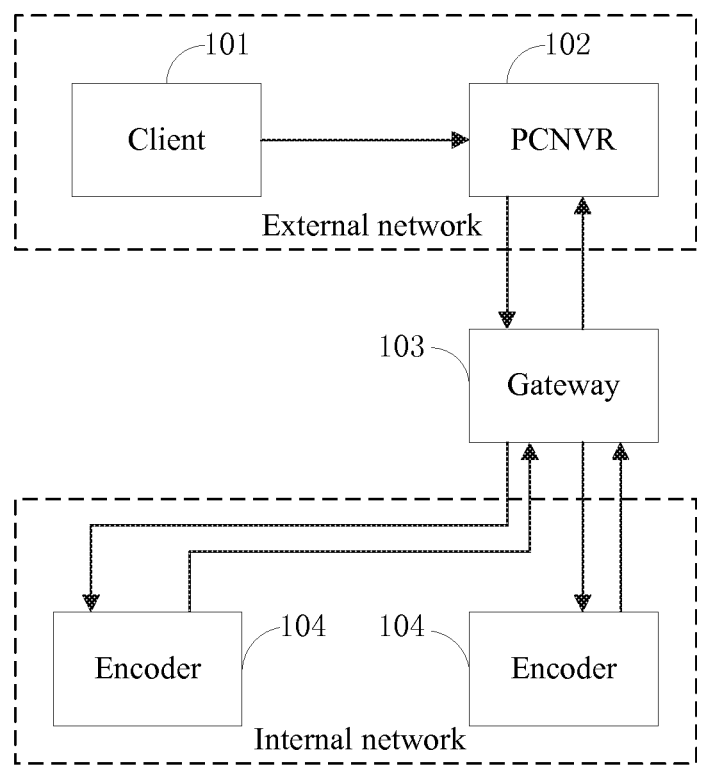
FIG. 1 is a schematic diagram illustrating a structure of a current system for storing data across networks.
Figure 2:
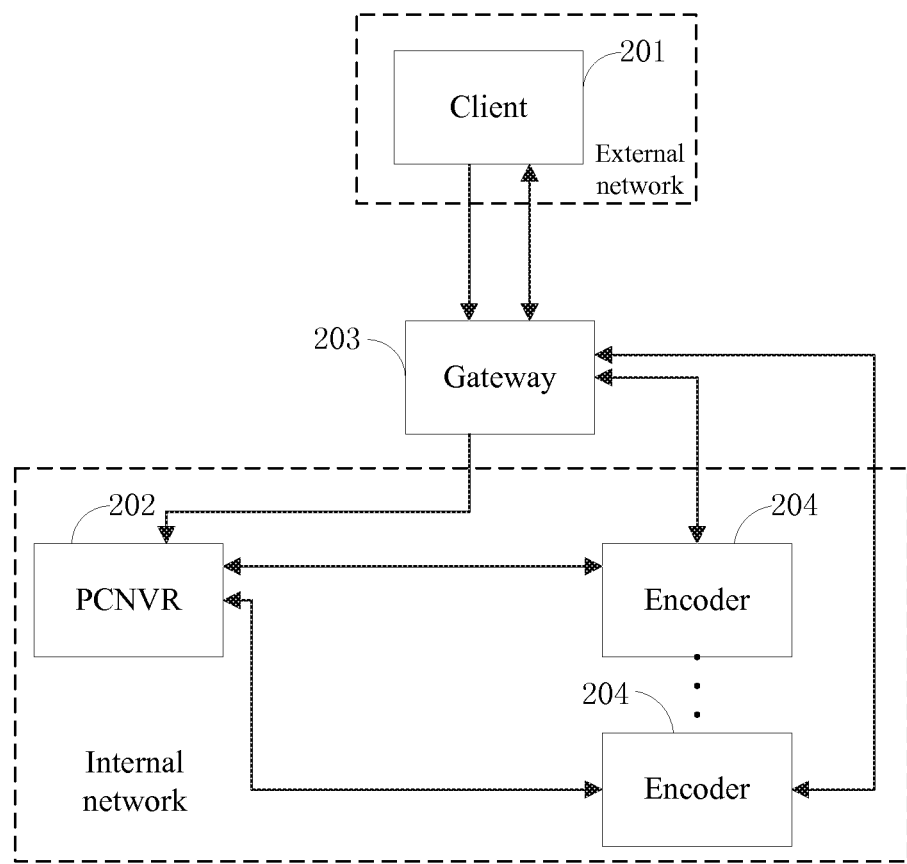
FIG. 2 is a schematic diagram illustrating a structure of a system for storing data across networks according to an embodiment of the present invention.

FIG. 2 is a schematic diagram illustrating a structure of a system for storing data across networks according to an embodiment of the present invention. According to FIG. 2, the system for storing data across networks is illustrated as follows.

According to the embodiment of the present invention, the system for storing data across networks includes: a client 201, a PCNVR 202, a gateway 203 and at least one encoder 204. The gateway 203 is configured to connect the external network and the internal network to implement interconnection between two networks on a transmission layer. The external network may be a wide area network, e.g., a home internet (China Telecommunications, China Mobile, China Netcom etc.), or may be a bank private network or a police private network. The external network may be a local area network established in a video monitoring process or a video collection process, or may be a bank private network or a police private network. The external network and the internal network may include networks having a same characteristic or different characteristics. Differences between the two networks are in that different IP address segments are used. For example, an IP address segment used by the internal network is 192.0.0.1-192.0.0.255, and an IP address segment used by the external network is 172.9.8.1-172.9.8.255. The internal network and the external network may be connected through the gateway. The client 201 accesses the external network. The PCNVR 202 and the at least one encoder 204 access the internal network.

The client 201 may receive an IP address and a port number of an encoder in the external network outputted externally, and also may receive an IP address and a port number of the PCNVR in the external network outputted externally. The client 201 generates an address obtaining instruction, transmits the address obtaining instruction, the IP address and the port number of the encoder in the external network to the gateway 203, and receives the IP address and the port number in the internal network transmitted from the gateway 203.

The client 201 generates a flow obtaining instruction according to the received IP address and the port number of the encoder in the internal network, and transmits the flow obtaining instruction, the IP address and the port number of the PCNVR in the external network to the gateway 203. The flow obtaining instruction at least carries the IP address and the port number of the encoder in the internal network.

The gateway 203 establishes a communication link between the external network and the internal network, maps an IP address and a port number in the external network to an IP address and a port number in the internal network according to a network segment of the external network and a network segment of the internal network. In particular, the IP address and the port number of the encoder in the external network is mapped to the IP address and the port number of the encoder in the internal network. The IP address and the port number of the PCNVR in the external network is mapped to the IP address and the port number of the PCNVR in the internal network. According to the port number, the gateway 203 performs mapping between the IP address in the external network and the IP address in the internal network.

The gateway 203 forwards the address obtaining instruction received from the client 201 to the mapped IP address and the port number of the encoder in the internal network, and forwards to the client 201 the IP address and the port number of the encoder in the internal network from the encoder 204. The gateway 203 forwards the flow obtaining instruction received from the client to the mapped IP address and the port number of the PCNVR in the internal network. In the embodiment of the present invention, the gateway 203 may adapt a switch or a router the structure of which is not described repeatedly herein.

According to the address obtaining instruction forwarded by the gateway 204, the encoder 204 transmits the IP address and the port number of the encoder 204 in the internal network to the client 201 via the communication link established among the client 201, the gateway 203 and the encoder 204 across the external network and the internal network. The encoder 204 parses the flow obtaining instruction transmitted by the PCNVR 202 through the internal network, obtains the IP address and the port number of the PCNVR in the internal network, and pushes the code flow required by the PCNVR 202 to the IP address and the port number of the PCNVR in the internal network through the internal network. The encoder 204 may perform analog-digital conversion for a received analog signal, may compress a converted digital signal according to an audio-video compression algorithm, and may temporarily store a compressed code flow.

The PCNVR 202 parses the flow obtaining instruction forwarded by the gateway 203, obtains the IP address and the port number of the encoder in the internal network, reads the IP address and the port number of the encoder in the internal network, and generates the code flow obtaining instruction. The PCNVR 202 transmits the code flow obtaining instruction to the IP address and the port number of the encoder in the internal network through the internal network, receives the code flow from the encoder 204 through the internal network, and stores the code flow as a file.

Figure 3:
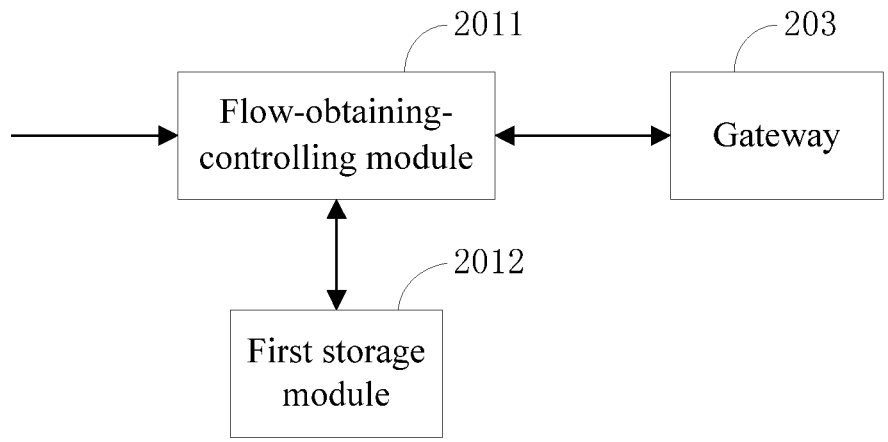
FIG. 3 is a schematic diagram illustrating a structure of a client according to an embodiment of the present invention.

FIG. 3 is a schematic diagram illustrating a structure of a client according to an embodiment of the present invention. According to FIG. 3, the client is illustrated as follows.

In the embodiment of the present invention, the client 201 includes a flow-obtaining-controlling module 2011 and a first storage module 2012. The flow-obtaining-controlling module 2011 connects with a gateway 203 through an external network, and establishes a communication link with the gateway 203.

the flow-obtaining-controlling module 2011 generates an address obtaining instruction according to a received IP address and a port number of the encoder in the external network, transmits the address obtaining instruction, the IP address and the port number of the encoder in the external network to the gateway 203, writes the IP address and the port number of the encoder in the internal network forwarded by the gateway 203 into the first storage module 2012, generates a flow obtaining instruction according to the received IP address and the port number of the encoder in the internal network, and transmits to the gateway 203 the flow obtaining instruction, the IP address and the port number of the PCNVR in the external network. The IP address and the port number of the PCNVR in the external network may be externally inputted, or may be pre-configured in the client 201.

The first storage module 2012 stores the IP address and the port number of the encoder in the internal network.

Figure 4:
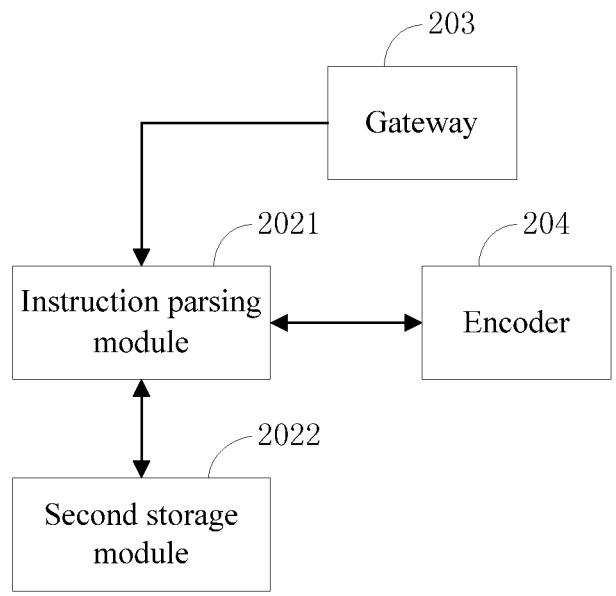
FIG. 4 is a schematic diagram illustrating a structure of a PCNVR according to an embodiment of the present invention.

FIG. 4 is a schematic diagram illustrating a structure of a PCNVR according to an embodiment of the present invention. According to FIG. 3, the PCNVR is illustrated as follows.

The PCNVR 202 includes an instruction parsing module 2021 and a second storage module 2022. The instruction parsing module 2021 connects with a gateway 203 and at least one encoder 204 through an internal network.

The instruction parsing module 2021 parses a flow obtaining instruction from the gateway 203, obtains an IP address and a port number of the encoder in the internal network, generates a code flow obtaining instruction according to the IP address and the port number of the encoder in the internal network, transmits the code flow obtaining instruction to the encoder 204 through the internal network, and writes into the second storage module 2022 a code flow pushed by the encoder 204. The code flow obtaining instruction at least carries an IP address and a port number of the PCNVR in the internal network.

The second storage module 2022 stores the code flow as a file.

Figure 5:
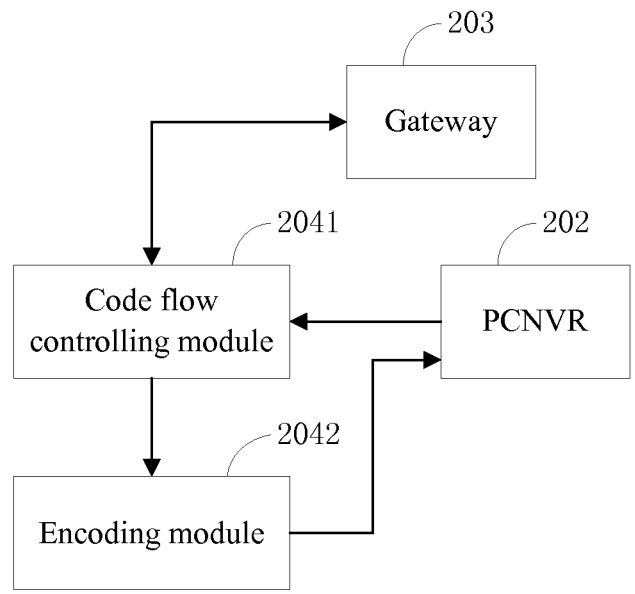
FIG. 5 is a schematic diagram illustrating a structure of an encoder according to an embodiment of the present invention.

FIG. 5 is a schematic diagram illustrating a structure of an encoder according to an embodiment of the present invention. According to FIG. 5, the PCNVR is illustrated as follows.

The encoder 204 includes a code flow controlling module 2041 and an encoding module 2042. The code flow controlling module 2041 connects with a PCNVR 202 through a gateway 203.

The code flow controlling module 2041 reads an IP address and a port number of the encoder in the internal network according to an address obtaining instruction, and transmits the IP address and the port number of the encoder in the internal network to the gateway 203, parses a code flow obtaining instruction from the PCNVR 202, obtains an IP address and a port number of the PCNVR in the internal network, and transmits the IP address and the port number of the PCNVR in the internal network to the encoding module 2042.

After decoding the received code flow obtaining instruction according to a trigger, the encoding module 2042 pushes the code flow obtained after compression to the IP address and the port number of the PCNVR in the internal network. The encoding module 2042 further coverts an analog signal to a digital signal, compresses the converted digital signal according to a video compression algorithm, obtains the code flow, and outputs the code flow to the PCNVR 202.

Figure 6:
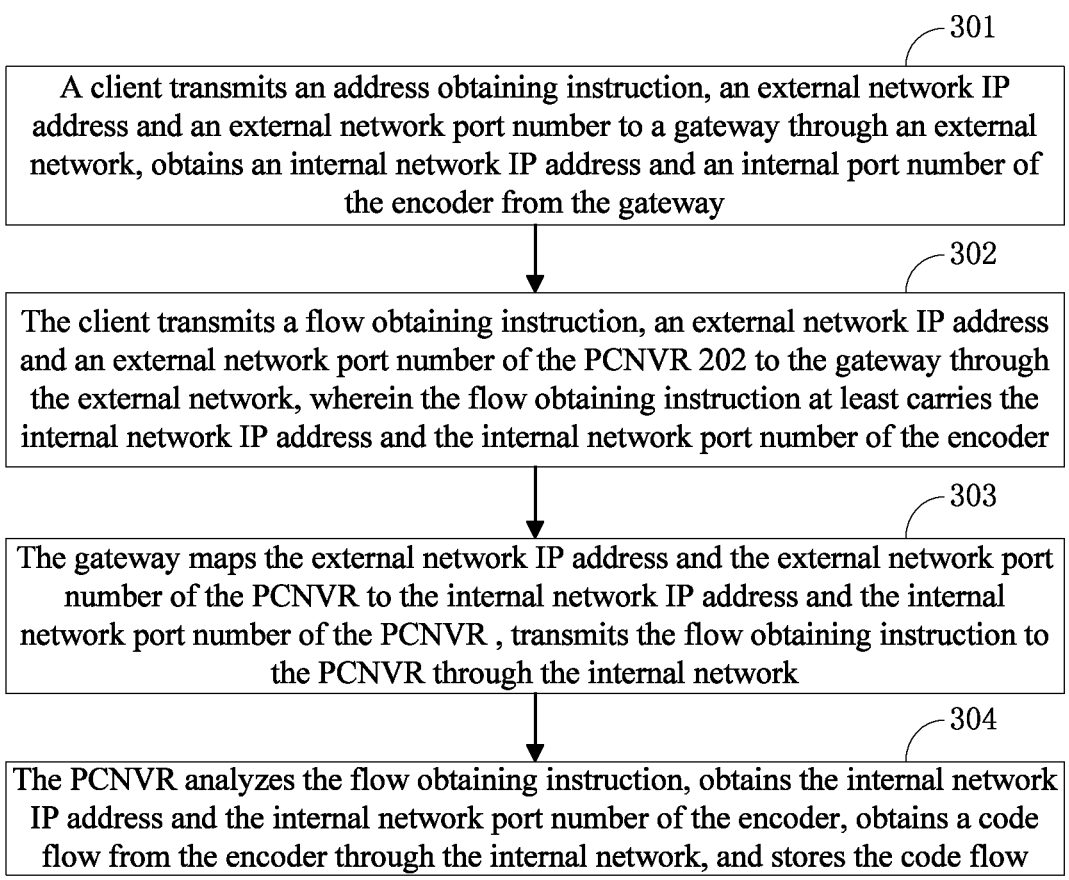
FIG. 6 is a schematic diagram illustrating a method for storing data across networks according to an embodiment of the present invention.

FIG. 6 is a flowchart illustrating a method for storing data across networks according to an embodiment of the present invention. According to FIG. 6, the PCNVR is illustrated as follows.

At block 301, a client transmits an address obtaining instruction, an IP address and a port number in the external network to a gateway through an external network, obtains an IP address and a number of the encoder in the internal network from the gateway.

This block includes a step 3011 that the client 201 generates the address obtaining instruction according to the received IP address and the port number of the encoder in the external network, transmits the address obtaining instruction, the IP address and the port number of the encoder in the external network to the gateway 203 through the external network, a step 2012 that the gateway 203 maps the IP address and the port number of the encoder in the external network to the IP address and the port number of the encoder in the internal network, and transmits the address obtaining instruction to the encoder 204 through the internal network, a step 2013 that the encoder 204 transmits the address obtaining instruction, the IP address and the port number of the encoder in the internal network to the gateway 203 through the internal network, and a step 2014 that the gateway 203 forwards the IP address and the port number of the encoder in the internal network to the client 201.

At block 302, the client transmits a flow obtaining instruction, an IP address and a port number of the PCNVR 202 in the external network to the gateway through the external network, wherein the flow obtaining instruction at least carries the IP address and the port number of the encoder in the internal network.

This block includes a step 3021 that the client 201 generates the flow obtaining instruction according to the IP address and the port number of the encoder in the internal network, a step 3022 that the client transmits the flow obtaining instruction, the received IP address and the port number of the PCNVR in the external network to the gateway 203 through the external network.

At block 303, the gateway 203 maps the IP address and the port number of the PCNVR in the external network to the IP address and the port number of the PCNVR 202 in the internal network, transmits the flow obtaining instruction to the PCNVR 202 through the internal network.

At block 304, the PCNVR 202 parses the flow obtaining instruction, obtains the IP address and the port number of the encoder in the internal network, obtains a code flow from the encoder 204 through the internal network, and stores the code flow.

This block includes a step 3031 that the PCNVR 202 parses the flow obtaining instruction, obtains the IP address and the port number of the encoder in the internal network, generates a code flow obtaining instruction according to the IP address and the port number of the PCNVR 202 in the internal network, transmits the code flow obtaining instruction to the IP address and the port number of the encoder 204 in the internal network through the internal network, a step 3032 that the encoder 204 parses the code flow obtaining instruction, obtains the IP address and the port number of the PCNVR 202 in the internal network, pushes the code flow to the IP address and the port number of the PCNVR 202 in the internal network through the internal network.

An example as follows is taken to illustrate an implementing process.

A router is taken as a gateway. The router performs a cross-network processing. There are two network segments, i.e., a network segment for an internal network of the router is 192.168.0.1-192.168.0.254, and the network segment for an external network of the router is 172.9.7.1-172.9.7.254. When the client accesses the external network of the router, an IP address in the external network 172.9.7.223 is allocated for the client. When the PCNVR accesses the internal network of the router, an IP address 192.168.0.4 in the internal network is allocated for the PCNVR. When the encoder accesses the internal network of the router, an IP address 192.168.0.6 in the internal network is allocated for the encoder. When the router accesses the external network, an IP address of the router in the external network is 172.9.7.22. Since the internal network of the router is a gateway, the IP address of the router in the internal network is 192.168.0.1.

When the encoder is added to the client, the IP address 172.9.7.22 and the port number 8000 of the encoder in the external network are inputted. When the client connects with the encoder, the router obtains the IP address 192.168.0.6 in the internal network and the internal network port number 8000 according to a unique mapping relationship, and forwards the address obtaining instruction to the encoder.

The encoder has stored the local IP address and the local port number of the encoder, i.e., the IP address 192.168.0.6 and the port number 8000 in the internal network. The client establishes a communication link with the encoder through the encoder, obtains an internal IP address 192.168.0.6 and an internal network port number 8000 of the encoder from the encoder, and transmits the IP address 192.168.0.6 and the port number 8000 in the internal network to the PCNVR according to the address allocated for the PCNVR in the external network. Thus, the PCNVR in the internal network can use the IP address 192.168.0.6 to connect with the encoder in the internal network to obtain the code flow.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A system for storing data across networks, the system comprising:
    a gateway to connect a first network and a second network, wherein a client locates in the first network and a Net Video Record Software for Personal computer (PCNVR) device and at least one encoder locate in the second network;
    the client located in the first network, to receive externally a first IP address and a first port number of the encoder which are assigned for the first network communication, transmit an address obtaining instruction, the first IP address and the first port number of the encoder of the encoder to the gateway, obtain a second IP address and a second port number of the encoder which are assigned for the second network communication from the gateway; receive externally a first IP address and a first port number of the PCNVR device which are assigned for the first network communication, transmit a flow obtaining instruction, the first IP address and the first port number of the PCNVR device to the gateway, wherein the flow obtaining instruction at least carries the second IP address and the second port number of the encoder;
    the encoder located in the second network, to receive the address obtaining instruction forwarded from the gateway according to the first IP address and the first port number of the encoder, transmit the second IP address and the second port number of the encoder to the gateway;
    the gateway to map the first IP address and the first port number of the PCNVR device to a second IP address and a second port number of the PCNVR device which are assigned for the second network communication, transmit the flow obtaining instruction according to the second IP address and the second port number of the PCNVR device; and
    the PCNVR device located in the second network, to parse the flow obtaining instruction, obtain the second IP address and the second port number of the encoder, obtain the code flow from the encoder through the second network, and store the code flow.

2. The system of claim 1, wherein the client comprises:
    a flow-obtaining-controlling module to connect with the gateway through the first network, generate the address obtaining instruction according to the received first IP address and the first port number of the encoder, transmit the address obtaining instruction, the first IP address and the first port number of the encoder to the gateway, write the second IP address and the second port number of the encoder forwarded from the encoder to a first storage module, generate the flow obtaining instruction, transmit the flow obtaining instruction, the first IP address and the first port number of the PCNVR device to the gateway;
    the first storage module to store the second IP address and the second port number of the encoder.

3. The system of claim 1, wherein the PCNVR device comprises:
    an instruction parsing module to connect with the gateway through the second network, parse the flow obtaining instruction from the gateway, obtain the second IP address and the second port number of the encoder, transmit a code flow obtaining instruction to the encoder, write the code flow pushed by the encoder to a second storage module, wherein the code flow obtaining instruction at least carries the second IP address and the second port number of the PCNVR device;
    the second storage module to store the code flow as a file.

4. The system of claim 1, wherein the encoder comprises:
    a code flow controlling module to connect with the gateway and the PCNVR device through the second network, transmit the second IP address and the second port number of the encoder to the gateway according to the address obtaining instruction, parse a code flow obtaining instruction from the PCNVR device to obtain the second IP address and the second port number of the PCNVR device, and transmit the second IP address and the second port number of the PCNVR device to an encoding module;
    the encoding module to push a code flow obtained after compression to the second IP address and the second port number of the PCNVR device.

5. A method for storing data across networks, wherein a client locates in the first network, a Net Video Record Software for Personal computer (PCNVR) device and at least one encoder locate in the second network, the method comprising:
    (A) receiving, by the client located in the first network, externally at first IP address and a first port number of the encoder which are assigned for the first network communication, transmitting an address obtaining instruction, the first IP address and the first port number of the encoder to the gateway, obtaining a second IP address and a second port number of the encoder which are assigned for the second network communication from the gateway;
    (B) receiving, by the client located in the first network, externally a first IP address and a first port number of the PCNVR device which are assigned for the first network communication, transmittal a flow obtaining instruction, the first IP address and the first port number of the PCNVR device to the gateway, wherein the flow obtaining instruction at least carries the second IP address and the second port number of the encoder;

(C) mapping, by the gateway, the first IP address and the first port number of the PCNVR device to a second IP address and a second port number of the PCNVR device which are assigned for the second network communication, transmitting the flow obtaining instruction to the PCNVR device according to the second IP address and the second port number of the PCNVR device; and (D) parsing, by the PCNVR device located in the second network, the flow obtaining instruction, obtaining the second IP address and the second port number of the encoder, obtaining the code flow from the encoder through the second network, storing the code flow.

6. The method of claim 5, wherein (A) comprises:

(A1) generating, by the client, the address obtaining instruction according to the received first IP address and the first port number of the encoder, transmitting the address obtaining instruction, the first IP address and the first port number of the encoder to the gateway through the first network;

(A2) mapping, by the gateway, the first IP address and the first port number of the encoder to the second IP address and the second port number of the encoder, transmitting the address obtaining instruction to the encoder through the second network;

(A3) transmitting, by the encoder, the second IP address and the second port number of the encoder to the gateway through the second network according to the received address obtaining instruction; and (A4) forwarding, by the gateway, the received second IP address and the second port number of the encoder to the client.

7. The method of claim 5, wherein (B) comprises:

(B1) generating, by the client, a flow obtaining instruction according to the second IP address and the second port number of the encoder; and (B2) transmitting, by the client, the flow obtaining instruction and the received first IP address and the first port number of the PCNVR device to the gateway through the first network.

8. The method of claim 5, wherein (D) comprises:

(D1) parsing, by the PCNVR device, the flow obtaining instruction, obtaining the second IP address and the second port number of the encoder, generating a code flow obtaining instruction according to the second IP address and the second port number of the PCNVR device, transmitting the code flow obtaining instruction to the second IP address and the second port number to the encoder through the second network; and (D2) parsing, by the encoder, the code flow obtaining instruction, obtaining the second IP address and the second port number of the PCNVR device, pushing the code flow to the second IP address and the second port number of the PCNVR device through the second network.

* * * * *